United States Patent
Jaycox et al.

(10) Patent No.: US 7,062,884 B2
(45) Date of Patent: Jun. 20, 2006

(54) LOCKING ASSEMBLY FOR SHUTTERS

(75) Inventors: Jeffrey S. Jaycox, Florence, SC (US); David Cottingham, Dillon, SC (US)

(73) Assignee: Tapco International, Wixom, MI (US)

( * ) Notice: Subject to any disclaimer, the term of this patent is extended or adjusted under 35 U.S.C. 154(b) by 449 days.

(21) Appl. No.: 10/264,477

(22) Filed: Oct. 4, 2002

(65) Prior Publication Data

US 2004/0031218 A1    Feb. 19, 2004

Related U.S. Application Data

(60) Provisional application No. 60/404,016, filed on Aug. 16, 2002.

(51) Int. Cl.
*E06B 1/60* (2006.01)

(52) U.S. Cl. ............... 52/203; 52/202; 52/DIG. 12; 49/394; 403/387; 403/232.1; 403/231; 292/297

(58) Field of Classification Search .............. 52/202, 52/203, DIG. 12, 127.8, 127.6, 656.9, 285.4, 52/285.2, 283; 403/387, 232.1, 231, 234; 49/394; 211/4; 248/159
See application file for complete search history.

(56) References Cited

U.S. PATENT DOCUMENTS

| | | | | |
|---|---|---|---|---|
| 656,275 | A | * | 8/1900 | Streeter ...................... 403/387 |
| 729,445 | A | * | 5/1903 | Streeter ...................... 403/387 |
| 1,834,421 | A | * | 12/1931 | Rawson ...................... 403/387 |
| 2,221,005 | A | * | 11/1940 | Reese ........................... 52/202 |
| 2,963,753 | A | * | 12/1960 | Seaburg ........................ 49/409 |
| 3,612,461 | A | * | 10/1971 | Brown ........................ 248/317 |
| 4,193,235 | A | * | 3/1980 | Cucchiara .................... 52/202 |
| 4,408,428 | A | * | 10/1983 | Brooke et al. ........... 52/506.07 |
| 4,423,897 | A | * | 1/1984 | Williams ..................... 292/288 |
| 4,905,952 | A | * | 3/1990 | Pinquist ...................... 248/317 |
| 4,938,154 | A | * | 7/1990 | Watt ........................... 109/49.5 |
| 5,077,951 | A | * | 1/1992 | Baker ....................... 52/506.07 |
| 5,368,324 | A | * | 11/1994 | Kaim ....................... 280/438.1 |
| 5,428,930 | A | * | 7/1995 | Bagley et al. ........... 52/506.07 |
| 5,540,018 | A | | 7/1996 | Biggers |
| 6,089,300 | A | | 7/2000 | Woodside et al. |
| 6,125,905 | A | | 10/2000 | Woodside et al. |
| 6,131,354 | A | | 10/2000 | Thompson |
| 6,296,639 | B1 | | 10/2001 | Mullet et al. |
| 6,341,639 | B1 | | 1/2002 | Mullet et al. |

(Continued)

FOREIGN PATENT DOCUMENTS

FR    2682424    *   4/1993    ................. 49/394

(Continued)

*Primary Examiner*—Lanna Mai
*Assistant Examiner*—Phi Dieu Tran A
(74) *Attorney, Agent, or Firm*—Howard & Howard

(57) ABSTRACT

A lock for retaining shutters in a closed position is disclosed. The lock includes backing and retention brackets, and a fastener. The backing bracket is mounted to a dwelling to maintain the shutters spaced from the dwelling when the shutters are in the closed position. The retention bracket includes retention and locking portions. The retention portion is spaced from the backing bracket to enclose the shutters between the retention portion and the backing bracket when the shutters are in the closed position. As such, the shutters are prevented from opening from the closed position. The locking portion extends from the retention portion to operatively engage the backing bracket. The fastener extends through the backing bracket and the locking portion to lock the retention bracket to the backing bracket such that the shutters, which are enclosed between the retention portion and the backing bracket, are retained in the closed position.

6 Claims, 3 Drawing Sheets

U.S. PATENT DOCUMENTS

| | | | |
|---|---|---|---|
| 6,393,777 B1 * | 5/2002 | Renfrow | 52/202 |
| 6,408,592 B1 | 7/2002 | Hourani | |
| 2004/0010988 A1 * | 1/2004 | Jaycox et al. | 52/202 |

FOREIGN PATENT DOCUMENTS

| | | | | |
|---|---|---|---|---|
| GB | 2058897 | * | 4/1981 | 52/202 |

* cited by examiner

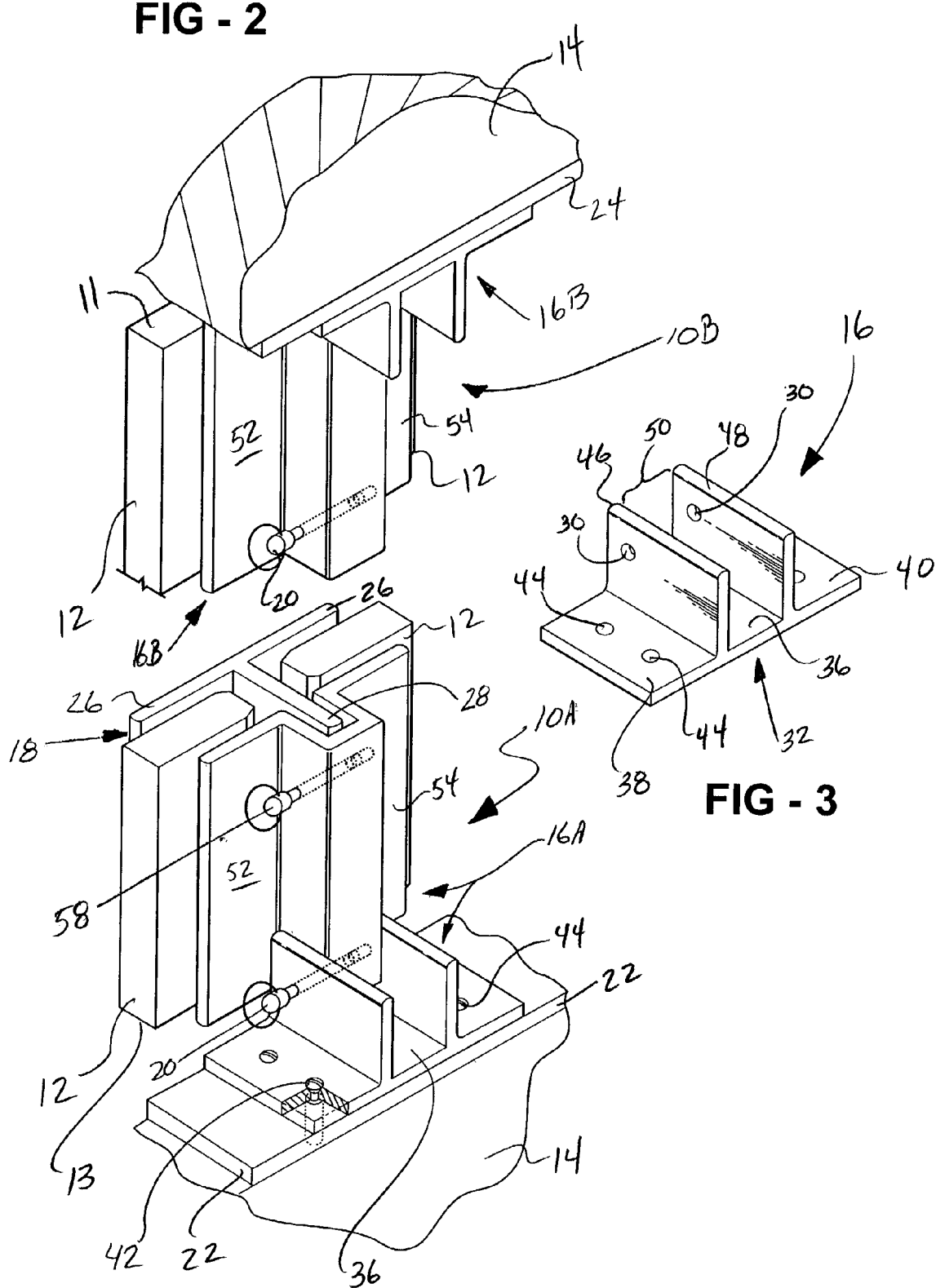

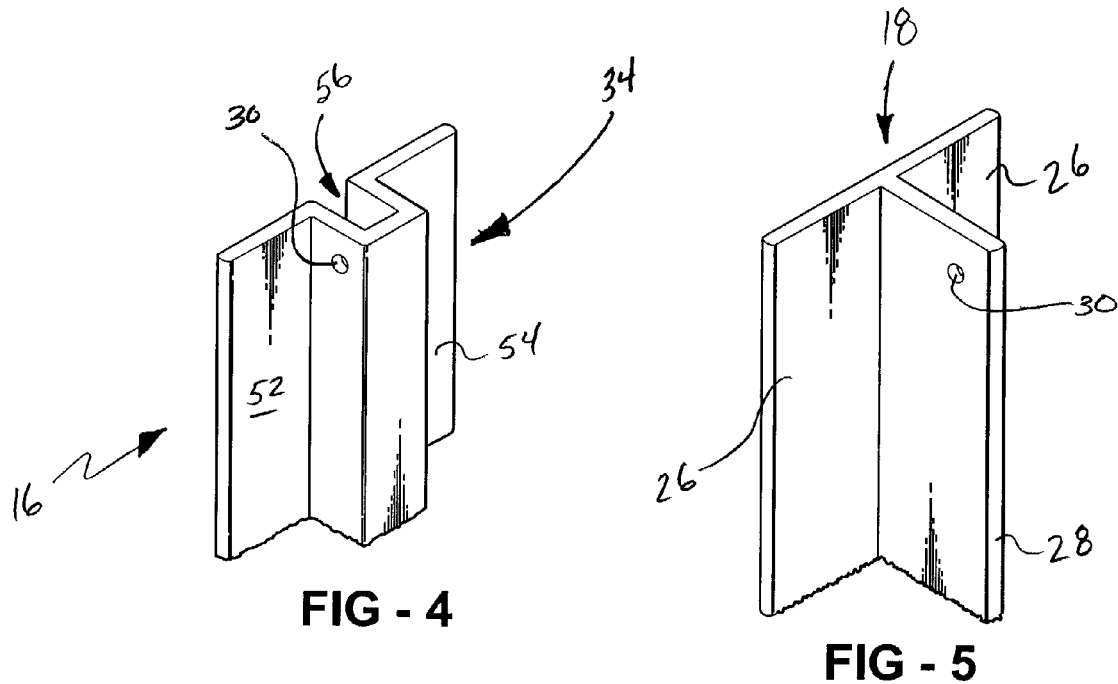
FIG - 4
FIG - 5
FIG - 6
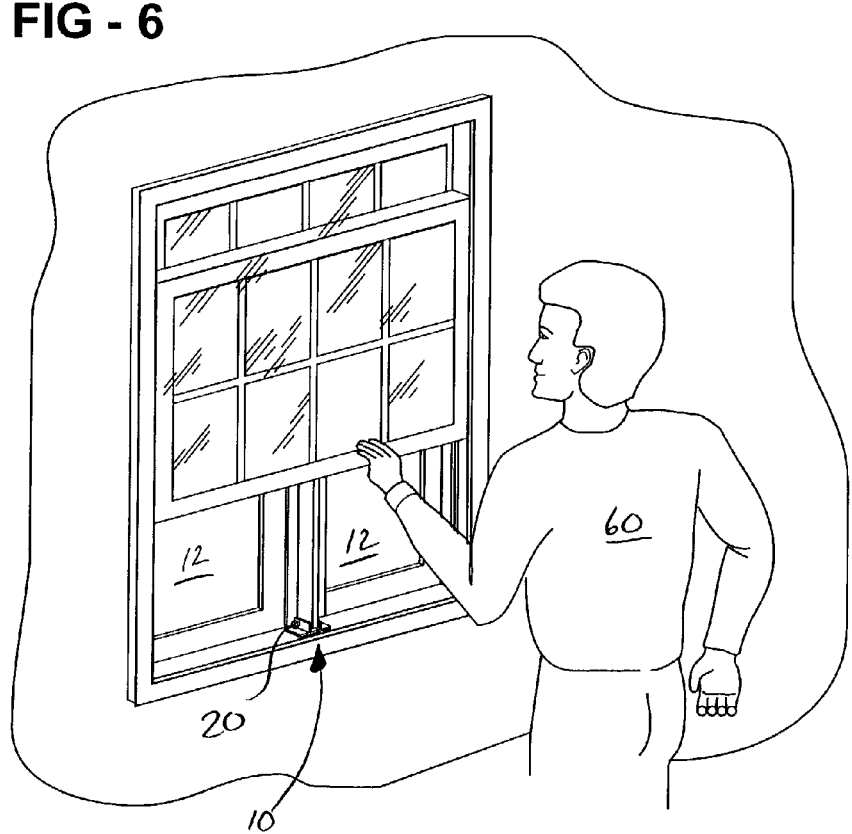

LOCKING ASSEMBLY FOR SHUTTERS

RELATED APPLICATIONS

This patent application claims priority to and all advantages of U.S. Provisional Patent Application No. 60/404,016 which was filed on Aug. 16, 2002.

FIELD OF THE INVENTION

The subject invention generally relates to locking assembly for shutters. More specifically, the subject invention relates to a locking assembly for retaining a pair of shutters in a closed position during inclement weather, such as precipitation storms, wind storms, and hurricanes.

BACKGROUND OF THE INVENTION

Various locking assemblies for shutters are known in the art. It is generally known that locking assemblies are utilized, when necessary, to lock pairs of shutters in a closed position on a dwelling. Shutters are used for both aesthetic and function purposes on the dwelling. In the closed position, the shutters function to protect windows, doors, and other openings of the dwelling during inclement weather, such as precipitation storms, wind storms, and hurricanes.

During such inclement weather, it is pertinent to lock, or retain, the shutters in the closed position such that the shutters can continue to provide adequate protection to the windows, doors, and other openings during and throughout the inclement weather. If the weather causes the shutters to open then the functional purpose of the shutters is defeated.

Conventional assemblies for locking pairs of shutters in the closed position are deficient for many reasons. For instance, the locking assemblies of the prior art do not adequately retain the shutters in the closed position throughout the inclement weather. In these assemblies, wind either bends or breaks the assembly and then causes the shutters to open. Also for instance, many conventional locking assemblies require direct drilling into and through the shutters to adequately retain the shutters in the closed position. In these assemblies the fastener extends through at least a portion of the shutters. As a result, to one degree or another, these convention locking assemblies damage the shutters such that, after the inclement weather, the aesthetic purpose of the shutters is negatively impacted.

Furthermore, some conventional locking assemblies, also referred to in the art as storm or locking bars, create an emergency egress issue that prevents occupants of the dwelling from escaping during an emergency, such as a fire. More specifically, a conventional storm bar is mounted across the shutters once the shutters have been closed. The storm bar is secured, typically screwed, into the dwelling on each side of the closed shutters to prevent the shutters from opening during the inclement weather. Screws are also used to connect the shutters to the storm bar such that the shutters can not be blown, or otherwise deflected, inward, i.e., toward the dwelling, during the inclement weather. With the storm bar screwed to the dwelling and the shutter screwed to the storm bar, the occupants of the dwelling cannot open a window or door from within the dwelling to release the storm bar and escape.

Due to the deficiencies in the locking assemblies of the prior art, including those described above, it is desirable to provide a novel locking assembly for shutters that adequately retains the shutters in a closed position on a dwelling such that protection to a window, door, or other opening is maximized throughout any inclement weather. It is also desirable to provide a locking assembly for shutters that does not physically damage the shutters to retain the shutters in a closed position. More specifically, it would be ideal to provide a locking assembly that retains the shutters in a closed position without a fastener extending through the shutters.

SUMMARY OF THE INVENTION AND ADVANTAGES

A locking assembly for shutters is disclosed. The locking assembly retains the shutters in a closed position on a dwelling. The locking assembly includes a backing bracket, a retention bracket, and a fastener. The backing bracket is adapted to be fixedly mounted to the dwelling for maintaining the shutters spaced from the dwelling when the shutters are in the closed position.

The retention bracket includes a retention portion and a locking portion. The retention portion is spaced from the backing bracket for enclosing at least a portion of the shutters between the retention portion and the backing bracket when the shutters are in the closed position. This prevents the shutters from opening from the closed position. The locking portion of the retention bracket extends substantially transversely from the retention portion to operatively engage the backing bracket.

The fastener then extends through both the backing bracket and the locking portion of the retention bracket to lock the retention bracket to the backing bracket. With the retention bracket locked to the backing bracket, the shutters are retained in the closed position. Importantly, the fastener does not physically damage the shutters as it extends through the backing bracket and the locking portion.

Accordingly, the subject invention provides a locking assembly for shutters that adequately retains the shutters in a closed position on a dwelling. Because the locking assembly of the subject invention adequately retains the shutters in the closed position, the protection provided by the shutters to the window, door, or other opening of the dwelling is maximized throughout any inclement weather. It is also advantageous that, with the locking assembly of the subject invention, the fastener locks the retention bracket to the backing bracket to retain the shutters in the closed position without physically damaging the shutters. Specifically, the fastener utilized according to the subject invention does not extend through, or otherwise even contact, the shutters.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view illustrating a locking assembly of the subject invention mounted to a sill of the dwelling and a locking assembly of the subject invention mounted to a header of the dwelling, both retaining the shutters in the closed position on the dwelling;

FIG. 3 is a perspective view illustrating a first backing component according to the subject invention;

FIG. 4 is a perspective view illustrating a second backing component according to the subject invention;

FIG. 5 is a perspective view illustrating a retention bracket according to the subject invention;

FIG. 6 is a perspective illustrating an occupant of the dwelling opening a window to access the locking assembly from within the dwelling.

DETAILED DESCRIPTION OF THE PREFERRED EMBODIMENT

Figure 1:
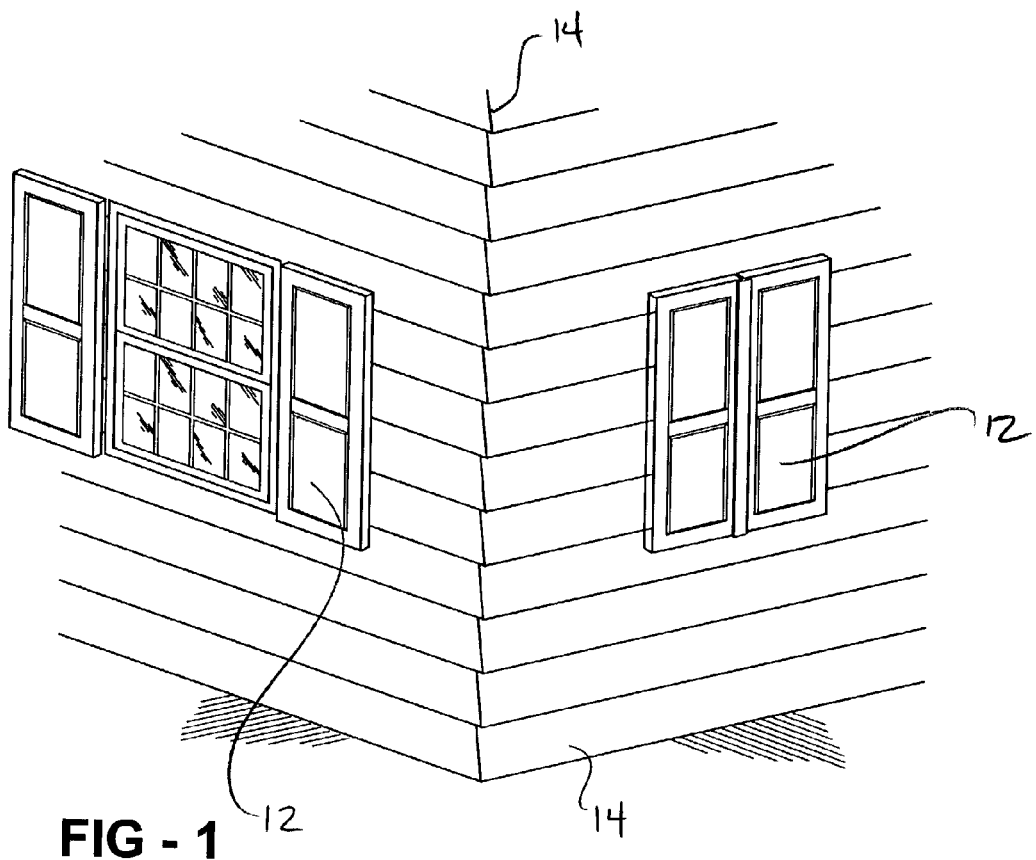
FIG. 1 is a perspective view of a dwelling having one pair of shutters in an open position and another pair of shutters in a closed position.

Referring to the Figures, wherein like numerals indicate like or corresponding parts throughout the several views, a locking assembly is generally disclosed at 10. Throughout the industry, the locking assembly 10 of the subject invention is also commonly referred to as a storm bar assembly. The locking assembly 10 retains a pair of shutters 12 in a closed position on a dwelling 14, such as a residential building, i.e., a house (as disclosed in FIG. 1), or a commercial building. The subject invention also includes a shutter assembly for protecting an opening of the dwelling 14, such as a window or door. In FIG. 1, one pair of shutters 12 is disclosed in an open position, and the other pair of shutters 12 is disclosed in the closed position. The shutters 12 are pivotable between the open position and the closed position.

The locking assembly 10 of the subject invention is used, in combination with the shutters 12 in the closed position, to protect the windows, the doors, and any other of the openings of the dwelling 14 during inclement weather, such as precipitation storms, wind storms, and hurricanes. To accomplish this protection, the locking assembly 10 includes a backing bracket 16, a retention bracket 18, and a fastener 20.

Referring primarily to FIG. 2, although it is not required, two locking assemblies 10 are typically applied at a top and a bottom of every window, door, or other opening such that the shutters 12 are adequately retained against the dwelling 14. Preferably, a first locking assembly 10A is adjacent a sill 22 of the dwelling 14 such that the backing bracket 16 of the first locking assembly 10A can be fixedly mounted to the sill 22, and a second locking assembly 10B is adjacent a header 24 of the dwelling 14 such that the backing bracket 16 of the second locking assembly 10B, i.e., a second backing bracket 16, can be fixedly mounted to the header 24. This second locking assembly 10B also includes a second retention bracket 18 including a second retention portion and a second locking portion, and a second fastener 20.

As understood by those skilled in the art, the sill 22 and the header 24 outline the top and bottom of the window, door, or other opening of the dwelling 14. For descriptive purposes only, the subject invention is described herein primarily in the context of the locking assembly 10 that is disposed at the bottom of the window where the locking assembly 10 is adjacent the sill 22, i.e., primarily in the context of the first locking assembly 10A. However, the ensuing description also applies to the locking assembly 10 that is disposed at the top of the window adjacent the header 24, i.e., to the second locking assembly 10B.

The backing bracket 16 is adapted to be fixedly mounted to the dwelling 14 for maintaining, i.e., keeping, the shutters 12 spaced from the dwelling 14 when the shutters 12 are in the closed position. That is, the backing bracket 16 keeps the shutters 12 in a spaced relationship relative to the dwelling 14. Referring specifically to FIG. 2, there is one backing bracket 16A that is fixedly mounted to the sill 22 of the dwelling 14, and one backing bracket 16B that is fixedly mounted to the header 24 of the dwelling 14.

Referring to FIG. 5, the retention bracket 18 includes a retention portion 26 and a locking portion 28. As disclosed in FIG. 2, the retention portion 26 is spaced from the backing bracket 16 for enclosing at least a portion of the shutters 12 between the retention portion 26 and the backing bracket 16 when the shutters 12 are in the closed position. This prevents the shutters 12 from opening from the closed position. That is, during inclement weather, the retention portion 26 of the retention bracket 18 prevents the shutters 12 from moving away from the dwelling 14 into an open position. The locking portion 28 extends substantially transversely from the retention portion 26 to operatively engage the backing bracket 16. A shutter gap is defined between the shutters 12 in the closed position, and it is most preferred that the locking portion 28 extends through the shutter gap to operatively engage the backing bracket 16. For clarification purposes in the Figures, the shutter gap is not numbered. It is to be understood that the locking assembly 10 of the subject invention may also be mounted to a lateral frame of the dwelling 14 extending between the sill 22 and the header 24, and not to either the sill 22 or the header 24, such that the locking portion 28 does not extend through the shutter gap at all.

Although it is not required, it is preferred that the locking portion 28 and the retention portion 26 are integral with one another, i.e., are one piece. However, the locking portion 28 and the retention portion 26 may be two pieces provided the locking portion 28 and the retention portion 26 are suitably connected.

The fastener 20 extends through the backing bracket 16 and the locking portion 28 of the retention bracket 18 to lock the retention bracket 18 to the backing bracket 16. Importantly, the retention bracket 18 is locked to the backing bracket 16, and the shutters 12 are retained in the closed position without the fastener 20 physically damaging the shutters 12 themselves. Preferably, the fastener 20 is a cotter pin, as disclosed, but not numbered, in the Figures. The cotter pin may include a separate locking needle or may be a more modern-type cotter pin with spring loaded bearings embedded in the cotter pin that retract upon insertion through the components. The fastener 20 is not limited to cotter pins and may include many other types of fasteners 20 including, but not limited to, a nut-and-bolt assembly, other locking pins, and the like.

To accommodate the fastener 20, the backing bracket 16 and the locking portion 28 each include a fastening aperture 30 for receiving the fastener 20. When the locking assembly 10 is assembled, as disclosed in FIG. 2, each of the fastening apertures 30 are aligned such that the fastener 20 can extend longitudinally through both of the components 16, 18, specifically through the backing bracket 16 and the locking portion 28. With the retention bracket 18 locked to the backing bracket 16, the shutters 12 are retained in the closed position.

Although it is not required, it is preferred that the backing bracket 16 includes a first backing component 32 (FIG. 3) and a second backing component 34 (FIG. 4). If included, the first backing component 32 is utilized to fixedly mount the backing bracket 16 to the dwelling 14, and the second backing component 34 is mounted to the first backing component 32. With the second backing component 34 mounted to the first backing component 32, which is fixed relative to the dwelling 14, the second backing component 34 is also fixed relative to the dwelling 14 once it is mounted to the first backing component 32. The second backing component 34 receives the locking portion 28 of the retention bracket 18 and also maintains, or keeps, the shutters 12 spaced from the dwelling 14 when the shutters 12 are in the closed position.

Although the most preferred embodiment of the subject invention includes both the first and second backing components 32, 34 functioning as the backing bracket 16, it is to be understood that the first backing component 32 can function as the backing bracket 16, entirely independent of the second backing component 34, and that the second backing component 34 can function as the backing bracket 16, entirely independent of the first backing component 32. That is, the subject invention may include only the first backing component 32 as the backing bracket 16, or only the second backing component 34 as the backing bracket 16.

If only the first backing component 32 is included, then the first backing component 32 is fixedly mounted to the dwelling 14, the first backing component 32 receives the locking portion 28 of the retention bracket 18, and the first backing component 32 is adapted to maintain the shutters 12 spaced from the dwelling 14 when the shutters 12 are in the closed position. On the other hand, if only the second backing component 34 is included, then the second backing component 34 is adapted to be fixedly mounted to the dwelling 14, the second backing component 34 receives the locking portion 28 of the retention bracket 18, and the second backing component 34 maintains the shutters 12 spaced from the dwelling 14 when the shutters 12 are in the closed position.

Because both the first and second backing components 32, 34 are included in the most preferred embodiment, the subject invention is only described below as if the locking assembly 10 includes both the first and second backing components 32, 34 as the backing bracket 16. However, as established above, the locking assembly 10 may only include the first backing component 32, the retention bracket 18, and the fastener 20, or the locking assembly 10 may only include the second backing component 34, the retention bracket 18, and the fastener 20.

Referring more specifically to FIGS. 2 and 3, the first backing component 32 includes a central portion 36. The central portion 36 is the component of the first backing component 32 that is adapted to be fixedly mounted to the dwelling 14. The central portion 36 has first and second sides, not numbered. The first backing component 32 further comprises a first flange portion 38 and a second flange portion 40. The first flange portion 38 extends from the first side of the central portion 36, and the second flange portion 40 extends from the second side of the central portion 36. At least one of the first and second flange portions 38, 40, preferably both, receive at least one fastener 42 for fixedly mounting the backing bracket 16 to the dwelling 14. This fastener 42 is not to be confused with the fastener 20 of the subject invention described above that extends through the backing bracket 16 and the locking portion 28 for retaining the shutters 12 in the closed position. Preferably, the fastener 42 for mounting the backing bracket 16 to the dwelling 14 is a threaded screw, nail, or the like. As disclosed in the Figures, the flange portions 38, 40 include a plurality of apertures 44, and a plurality of the fasteners 42 extend through the apertures 44 to mount the backing bracket 16 to the dwelling 14, specifically to the sill 22 or to the header 24. Although not required, it is preferred that molded plastic inserts, or anchors, are disposed in the sill 22 or the header 24 to receive the fasteners. The molded plastic inserts, or anchors, are disclosed in phantom in FIG. 2.

The first backing component 32 further comprises first and second support legs 46, 48. The first and second support legs 46, 48 are spaced from one another. Furthermore, the first and second support legs 46, 48 extend substantially transversely from at least one of the central portion 36 and the flange portions 38, 40 to define a gap 50. The gap 50 supports the second backing component 34. The second backing component 34 is at least partially disposed in the gap 50 between the first and second support legs 46, 48. The second backing component 34 is mounted to the first backing component 32 via the gap 50.

As disclosed in the preferred embodiment of FIG. 3, the first support leg 46 extends transversely from between the central portion 36 and the first flange portion 38, and the second support leg 48 extends transversely from between the central portion 36 and the second flange portion 40. Although it is not required, it is preferred that the flange portions 38, 40 and the first and second support legs 46, 48 are integral with the central portion 36. That is, it is preferred that all of the components, specifically the central portion 36, the first and second flange portions 38, 40, and the first and second support legs 46, 48, are one piece.

The fastener 20 extends through the first support leg 46, the second backing component 34, the locking portion 28 of the retention bracket 18, and the second support leg 48 to retain the shutters 12 in the closed position. As disclosed in FIGS. 3 through 5, to accommodate the fastener 20, the first support leg 46, the second backing component 34, the locking portion 28, and the second support leg 48 each include the fastening aperture 30 for receiving the fastener 20. The locking portion 28 of the second backing component 34 includes two fastening apertures 30, one adjacent a first lateral section 52 and one adjacent a second lateral section 54. The first and second lateral sections 52, 54 are described below. When the locking assembly 10 is assembled, as disclosed in FIG. 2, all of the fastening apertures 30 are aligned such that the fastener 20 can extend longitudinally through all of the components, specifically through the first support leg 46, the second backing component 34, the locking portion 28, and the second support leg 48.

Referring more specifically to FIGS. 2 and 4, the second backing component 34 includes the first lateral section 52 and the second lateral section 54. The first and second lateral sections 52, 54 extend substantially transversely to the first and second support legs 46, 48 to maintain the shutters 12 spaced from the dwelling 14 when the shutters 12 are in the closed position. These lateral sections 52, 54 prevent the shutters 12 from being blown inward toward the dwelling 14. These lateral sections 52, 54 are also spaced from the retention portion 26 of the retention bracket 18 for enclosing the portion of the shutters 12.

The second lateral section 54 is at least partially spaced from the first lateral section 52 to define a locking channel 56 therebetween. To operatively engage the second backing component 34, the locking portion 28 of the retention bracket 18 extends from the retention portion 26 into the locking channel 56. With the locking portion 28 of the retention bracket 18 in the locking channel 56, the fastener 20 extends through the first backing component 32, the locking channel 56, and the locking portion 28 of the retention bracket 18 to retain the shutters 12 in the closed position. More specifically, the fastener 20 extends through the first support leg 46, the locking channel 56, the locking portion 28 of the retention bracket 18, and the second support leg 48 to retain the shutters 12 in the closed position. As such, the retention portion 26 of the retention bracket 18 is locked to the locking channel 56 of the second backing component 34 and to the central portion 36 of the first backing component 32.

In one embodiment, the locking channel 56 extends substantially transversely from the first and second lateral sections 52, 54 of the second backing component 34 into the gap 50 of the first backing component 32 for mounting the second backing component 34 to the first backing component 32. The locking channel 56 extends into the gap 50 such that the fastening apertures 30 of the second backing component 34 align with the fastening apertures 30 of the first backing component 32, specifically with the fastening apertures 30 of the first and second support legs 46, 48.

Also, to optimally enclose the portion of the shutters 12, it is preferred that the first and second lateral support sections 52, 54 extend substantially parallel to the retention portion 26 of the retention bracket 18 when the locking assembly 10 is assembled (as disclosed in FIG. 2). With such an orientation, the first and second lateral support sections 52, 54 extend substantially parallel to a side of the dwelling 14.

Referring particularly to FIGS. 2 and 3, the first backing component 32 abuts the first and second lateral sections 52, 54 of the second backing component 34. Thus, the first backing component 32 maintains the second backing component 34 spaced from the dwelling 14. More specifically, the first support leg 46 of the first backing component 32 abuts the first lateral section 52 of the second backing component 34 to maintain the second backing component 34 spaced from the dwelling 14. Similarly, the second support leg 48 of the first backing component 32 abuts the second lateral section 54 of the second backing component 34 to maintain the second backing component 34 spaced from the dwelling 14.

In a preferred embodiment of the subject invention, an intermediate fastener 58 preferably extends through the second backing component 34, specifically the locking channel 56, and the locking portion 28 of the retention bracket 18. If the intermediate fastener 58 is utilized, then both the backing bracket 16 and the retention bracket 18, specifically the locking portion 28 of the retention bracket 18, include additional apertures more toward a middle portion of the shutters 12 for receiving the intermediate fastener 58. As such, this intermediate fastener 58 provides additional support to retain the shutters 12 in the closed position. The intermediate fastener 58 does not extend through the first backing component 32. More specifically, the intermediate fastener 58 does not extend through the first and second support legs 46, 48. The intermediate fastener 58 also does not extend through the shutters 12.

If the backing bracket 16 of the subject invention is only the first backing component 32 and not the second backing component 34, then the backing bracket 16 includes the central portion 36 having the first and second sides, the first and second flange portions 38, 40, and the first and second support legs 46, 48. The first and second support legs 46, 48 define the gap 50 for receiving the locking portion 28 of the retention bracket 18. The gap 50 receives the locking portion 28 independent of the locking channel 56 because the second backing component 34 is not present in this embodiment. In this embodiment, the first and second support legs 46, 48, and not the first and second lateral sections 52, 54, maintain the shutters 12 spaced from the dwelling 14 when the shutters 12 are in the closed position because the second backing component 34 is not included.

In this embodiment with only the first backing component 32, it is preferred that the flange portions 38, 40 and the first and second support legs 46, 48 are integral with, i.e., one piece with, the central portion 36. Furthermore, the locking portion 28 of the retention bracket 18 is at least partially disposed in the gap 50 between the first and second support legs 46, 48 for locking the retention bracket 18 to the backing bracket 16. Because the second backing component 34 is not utilized in this embodiment, the fastener 20 extends through the first support leg 46, the locking portion 28 of the retention bracket 18, and the second support leg 48 to retain the shutters 12 in the closed position.

On the other hand, if the backing bracket 16 of the subject invention is only the second backing component 34 and not the first backing component 32, then the backing bracket 16 includes the first lateral section 52 and the second lateral section 54 at least partially spaced from the first lateral section 52 to define the locking channel 56. In this embodiment, where only the second backing component 34 is utilized, the second backing component 34 is mounted directly to the sill 22 or the header 24 of the dwelling 14 without first being mounted to the first backing component 32 because the first backing component 32 is not present.

In this embodiment, the first and second lateral support sections 52, 54 of the backing bracket 16 extend substantially parallel to the retention portion 26 of the retention bracket 18 for enclosing the portion of the shutters 12, and the locking channel 56 extends substantially transversely from the first and second lateral sections 52, 54 for mounting the backing bracket 16 to the dwelling 14. That is, in this embodiment where the first backing component 32 is not included, it is preferred that the second backing component 34 is mounted to the sill 22 or the header 24 at the locking channel 56. With the second backing component 34 fixedly mounted to the sill 22 or the header 24 at the locking channel 56, the locking portion 28 of the retention bracket 18 extends from the retention portion 26 into the locking channel 56 to operatively engage the backing bracket 16.

Because the first backing component 32 is not utilized in this embodiment, the fastener 20 extends through the locking channel 56 and the locking portion 28 of the retention bracket 18 to retain the shutters 12 in the closed position.

As disclosed in FIGS. 3 through 5, the backing bracket 16 of the subject invention, especially the second backing component 34, is generally U-shaped, and the retention bracket 18 of the subject invention is generally T-shaped, with the T-shaped retention bracket 18 functioning as a male component to mate and engage with the U-shaped backing bracket 16 functioning as a female component.

Referring now to FIG. 6, in the event an emergency egress issue arises, such as during a fire, an occupant 60 of the dwelling 14 can still exit the dwelling 14 through the window, door, or other opening even though the locking assembly 10 is already locked. From within the dwelling 14, the occupant 60 simply opens the window, door, etc., that the shutters 12 are protecting to access the locking assembly 10. More specifically, the occupant 60 disengages the fastener 20 to unlock the locking assembly 10. With the locking assembly 10 unlocked, the occupant 60 can then easily force the shutters 12 from the closed position into the open position and exit the dwelling 14 as necessary.

In operation of the preferred embodiment, i.e., where both the first and second backing components 32, 34 make up the backing bracket 16, a user of the locking assembly 10 or assemblies 10 mounts the first backing component 32 of the first locking assembly 10A to the sill 22 and the first backing component 32 of the second locking assembly 10B to the header 24 in preparation for the inclement weather. Techniques known to those skilled in the art are utilized to mount these components, such as using a drill, with the molded plastic inserts, and with screws that extend through the flange portions 38, 40 of the first backing component 32 of the first locking assembly 10A into the sill 22, and with screws that extend through the flange portions 38, 40 of the first backing component 32 of the second locking assembly 10B into the header 24. Next, the second backing component 34 is secured in the gap 50 defined between the first and second support legs 46, 48. Preferably, the user chooses to secure one second backing component 34 in the gap 50 at the sill 22 for adequately retaining the shutters 12 against the dwelling 14 at the bottom, and one second backing component 34 in the gap 50 at the header 24 for adequately retaining the shutters 12 against the dwelling 14 at the top. Once the second backing components 34 are secured to the first backing components 32, the user closes the shutters 12, which are normally in the open position on the dwelling 14. Once the shutters 12 are in the closed position, the retention bracket 18 is installed such that the locking portion 28 of the retention bracket 18 extends through the shutter gap between the shutters 12 and into the locking channel 56 of the second backing components 34. As disclosed in FIG. 1, it is most preferred that the retention bracket 18 is one piece between the two locking assemblies 10A, 10B. However, one retention bracket 18 may be associated with the first locking assembly 10A, and one retention bracket 18 may be associated with the second locking assembly 10B. Next, the user locks the locking assembly 10 by installing the fastener 20, preferably the cotter pin, through the apertures 30 such that the fastener 20 extends through the first support leg 46, through the second backing component 34, specifically through the locking channel 56 of the second backing component 34, through the locking portion 28 of the retention bracket 18, and through the second support leg 48. Preferably, the introduction of the retention bracket 18 and the locking of the locking assembly 10 with the fastener 20 are done at one end, i.e., at either the top or the bottom. Then, once the shutters 12 are secured at the one end, then the same steps are repeated at the opposite end to introduce the retention bracket 18, if a separate retention bracket 18, and to lock the locking assembly 10 at that end. Furthermore, if desired, the user can install the intermediate fastener 58 more toward the middle portion of the shutters 12. As described above, the intermediate fastener 58 would not extend through the first and second support legs 46, 48, but only through the second backing component 34, specifically through the locking channel 56, and through the locking portion 28 of the retention bracket 18.

It is most preferred that the locking assembly 10 of the subject invention is utilized on the dwelling 14 in combination with an impact-resistant shutter assembly that does not fracture upon impact from debris. Such impact-resistant shutter assemblies are commonly referred to as storm-proof or storm-rated shutters 12. One such shutter assembly is disclosed in commonly assigned U.S. patent application Ser. No. 10/264,476, entitled "Impact-Resistant Shutter Assembly" which was filed on the same day as this application, the disclosure of which is herein incorporated by reference in its entirety. However, the locking assembly 10 of the subject invention may be used with any type of shutter 12, including conventional aluminum shutters which are primarily utilized for decorative purposes and are not impact-resistant.

As disclosed herein, the backing bracket 16 is essentially the female component and the retention bracket 18 is essentially the mating male component that extends into the female component where it is secured, i.e., locked. However, it is to be understood that it is possible for the components to be interchanged such that the backing bracket 16 is a male component and the retention bracket 18 is a female component so long as at least one of the backing bracket 16 and the retention bracket 18 can be adequately secured to the dwelling 14, either directly or indirectly.

Figure 7:
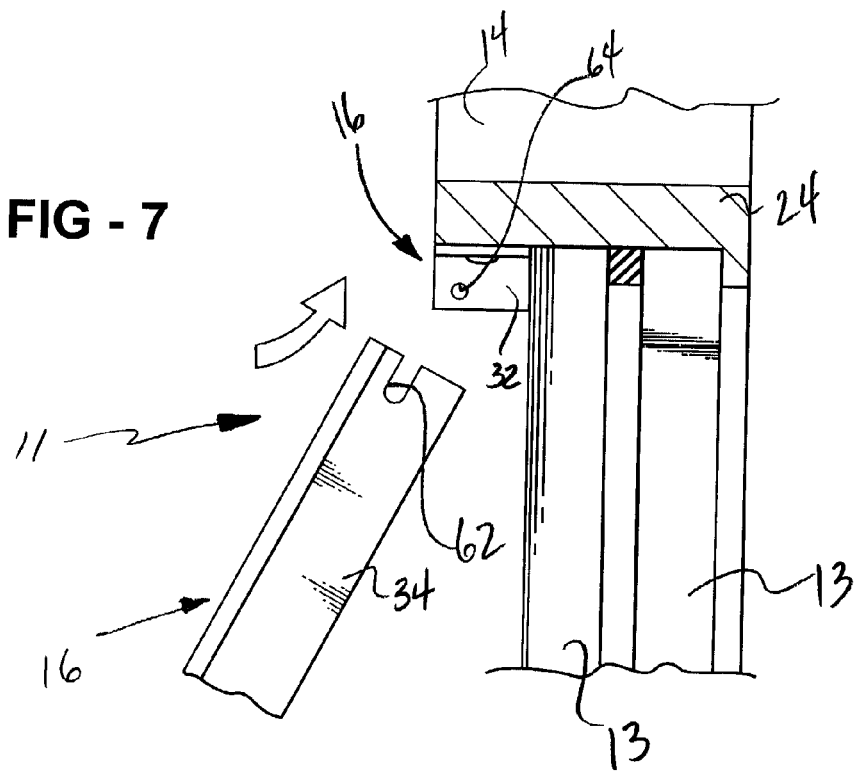
FIG. 7 is a partially cross-sectional side view of an alternative locking assembly according to the subject invention adapted to be mounted to the header of the window.

Finally, referring now to FIG. 7, an alternative locking assembly 11 is disclosed. The locking assembly 11 of this embodiment is typically applied where the dwelling 14 includes a double-hung window 13. This alternative locking assembly 11 is mounted to the header 24 of the dwelling 14. In this alternative embodiment, the backing bracket 16, specifically the second backing component 34, includes a channel 62, i.e., a slot, instead of the aperture 30. The backing bracket 16, specifically the first backing component 32, also includes a rod 64, i.e., a pin, extending from the first and second support legs 46, 48. The channel 62 of the second backing component 34 mates with the rod 64 of the first backing component 32 to removably mount the backing bracket 16, i.e., both the first and second backing components 32, 34, to the header 24. The arrow in FIG. 7 represents the channel 62 of the second backing component 34 mating with the rod 64 of the first backing component 32.

Due to this alternative embodiment, the occupant 60 of the dwelling 14 can still exit the dwelling 14 through the double-hung window 13 even though the occupant 60 is unable to access this alternative locking assembly 11 from within the dwelling 14 because the double-hung window 13 actually obstructs access to the alternative locking assembly 11. In this situation, the occupant 60 simply raises the double-hung window 13 and disengages the fastener 20 to unlock the locking assembly 10 that is mounted to the sill 22 of the double-hung window 13 (not disclosed in FIG. 7). With this locking assembly 10 unlocked, i.e., with the lower locking assembly 10 unlocked, the occupant 60 can then easily force the shutters 12 from the closed position into the open position. As this occurs, the shutters 12 force the second backing component 34 of the alternative locking assembly 11 away from the first backing component 32 such that the channel 62 and the rod 64 disengage, and the alternative locking assembly 11 falls to the ground. The occupant 60 can then exit the dwelling 14 as necessary.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that reference numerals are utilized merely for convenience and are not to be limiting in any way, and that the invention may be practiced otherwise than as specifically described.

What is claimed is:

1. A locking assembly for retaining a pair of shutters in a closed position on a dwelling, said locking assembly comprising:

a backing bracket adapted to be fixedly mounted to the dwelling for maintaining the shutters spaced from the dwelling when the shutters are in the closed position;

a retention bracket comprising a retention portion and a locking portion, said retention portion being spaced from said backing bracket for enclosing at least a portion of the shutters between said retention portion and said backing bracket when the shutters are in the closed position to prevent the shutters from opening from the closed position, and said locking portion extending substantially transversely from said retention portion to operatively engage said backing bracket;

a fastener extending through said backing bracket and said locking portion of said retention bracket to lock said retention bracket to said backing bracket for retaining the shutters in the closed position;

said backing bracket comprising a first backing component for said fixed mounting to the dwelling and a second backing component mounted to said first backing component for receiving said locking portion of said retention bracket and for maintaining the shutters spaced from the dwelling when the shutters are in the closed position;

said first backing component comprising a central portion having first and second sides;

said first backing component further comprising a first flange portion extending from said first side of said central portion, and a second flange portion extending from said second side of said central portion, wherein at least one of said first and second flange portions receive at least one fastener for said fixed mounting of said backing bracket to the dwelling;

said first backing component further comprising first and second support legs spaced from one another and extending substantially transversely from at least one of said central portion and said flange portions to define a gap for supporting said second backing component;

wherein said second backing component is at least partially disposed in said gap between said first and second support legs for said mounting to said first backing component; and said fastener extending through said first support leg, said second backing component, said locking portion of said retention bracket, and said second support leg to retain the shutters in the closed position.

2. A locking assembly for retaining a pair of shutters in a closed position on a dwelling, said locking assembly comprising:

a backing bracket adapted to be fixedly mounted to the dwelling for maintaining the shutters spaced from the dwelling when the shutters are in the closed position;

a retention bracket comprising a retention portion and a locking portion, said retention portion being spaced from said backing bracket for enclosing at least a portion of the shutters between said retention portion and said backing bracket when the shutters are in the closed position to prevent the shutters from opening from the closed position, and said locking portion extending substantially transversely from said retention portion to operatively engage said backing bracket;

a fastener extending through said backing bracket and said locking portion of said retention bracket to lock said retention bracket to said backing bracket for retaining the shutters in the closed position;

said backing bracket comprising a first backing component for said fixed mounting to the dwelling and a second backing component mounted to said first backing component for receiving said locking portion of said retention bracket and for maintaining the shutters spaced from the dwelling when the shutters are in the closed position said first backing component comprising a central portion having first and second sides;

said first backing component further comprising a first flange portion extending from said first side of said central portion, and a second flange portion extending from said second side of said central portion, wherein at least one of said first and second flange portions receive at least one fastener for said fixed mounting of said backing bracket to the dwelling;

said first backing component further comprising first and second support legs spaced from one another and extending substantially transversely from at least one of said central portion and said flange portions to define a gap for supporting said second backing component;

said second backing component comprising a first lateral section and a second lateral section at least partially spaced from said first lateral section to define a locking channel therebetween;

said locking channel extending substantially transversely from said first and second lateral sections into said gap of said first backing component;

said locking portion of said retention bracket extending from said retention portion into said locking channel to operatively engage said second backing component; and said fastener extending through said first support leg, said locking channel, said locking portion of said retention bracket, and said second support leg to retain the shutters in the closed position.

3. A locking assembly as set forth in claim 2 further comprising an intermediate fastener extending through said locking channel and said locking portion of said retention bracket for providing additional support to retain the shutters in the closed position.

4. A locking assembly for retaining a pair of shutters in a closed position on a dwelling, said locking assembly comprising:

a backing bracket adapted to be fixedly mounted to the dwelling for maintaining the shutters spaced from the dwelling when the shutters are in the closed position;

a retention bracket comprising a retention portion and a locking portion, said retention portion being spaced from said backing bracket for enclosing at least a portion of the shutters between said retention portion and said backing bracket when the shutters are in the closed position to prevent the shutters from opening from the closed position, and said locking portion extending substantially transversely from said retention portion to operatively engage said backing bracket;

a fastener extending through said backing bracket and said locking portion of said retention bracket to lock said retention bracket to said backing bracket for retaining the shutters in the closed position;

said backing bracket comprising a central portion having first and second sides;

said backing bracket further comprising a first flange portion extending from said first side of said central portion, and a second flange portion extending from said second side of said central portion, wherein at least one of said first and second flange portions receive at least one fastener for said fixed mounting of said backing bracket to the dwelling;

said backing bracket further comprising first and second support legs spaced from one another and extending substantially transversely from at least one of said central portion and said flange portions to define a gap for receiving said locking portion of said retention bracket;

wherein said locking portion of said retention bracket is at least partially disposed in said gap between said first and second support legs for locking said retention bracket to said backing bracket; and said fastener extending through said first support leg, said locking portion of said retention bracket, and said second support leg to retain the shutters in the closed position.

5. A locking assembly for retaining a pair of shutters in a closed position on a dwelling, said locking assembly comprising:
a first backing component adapted to be fixedly mounted to the dwelling for maintaining the shutters spaced from the dwelling when the shutters are in the closed position;
a second backing component mounted to said first backing component for maintaining the shutters spaced from the dwelling when the shutters are in the closed position;
a retention bracket comprising a retention portion and a locking portion, said retention portion being spaced from said second backing component for enclosing at least a portion of the shutters between said retention portion and said second backing component when the shutters are in the closed position to prevent the shutters from opening from the closed position, and said locking portion extending substantially transversely from said retention portion to operatively engage said first backing component;
a fastener extending through said first backing component, said second backing component, and said locking portion of said retention bracket to lock said retention bracket to said backing bracket for retaining the shutters in the closed position;
said first backing component comprising a central portion having first and second sides, a first flange portion extending from said first side of said central portion, and a second flange portion extending from said second side of said central portion, wherein at least one of said first and second flange portions receive at least one fastener for said fixed mounting of said first backing component to the dwelling;
said first backing component further comprising first and second support legs spaced from one another and extending substantially transversely from at least one of said central portion and said flange portions to define a gap for supporting said second backing component;
wherein said second backing component is at least partially disposed in said gap between said first and second support legs for said mounting to said first backing component;
said fastener extending through said first support leg, said second backing component, said locking portion of said retention bracket, and said second support leg to retain the shutters in the closed position;
said second backing component comprises a first lateral section and a second lateral section at least partially spaced from said first lateral section to define a locking channel therebetween;
said first and second lateral support sections extending substantially parallel to said retention portion of said retention bracket for enclosing the portion of the shutters;
said first support leg of said first backing component abutting said first lateral section of said second backing component to maintain said second backing component spaced from the dwelling, and said second support leg of said first backing component abutting said second lateral section of said second backing component to maintain said second backing component spaced from the dwelling;
said locking channel extending substantially transversely from said first and second lateral sections into said gap of said first backing component;
said locking portion of said retention bracket extending from said retention portion into said locking channel to operatively engage said second backing component; and
said fastener extending through said first support leg, said locking channel, said locking portion of said retention bracket, and said second support leg to retain the shutters in the closed position.

6. A locking assembly as set forth in claim 5 further comprising an intermediate fastener extending through said locking channel and said locking portion of said retention bracket for providing additional support to retain the shutters in the closed position.

* * * * *